(12) United States Patent
Troen-Krasnow et al.

(10) Patent No.: US 6,442,250 B1
(45) Date of Patent: Aug. 27, 2002

(54) SYSTEMS AND METHODS FOR TRANSMITTING MESSAGES TO PREDEFINED GROUPS

(75) Inventors: David Mark Troen-Krasnow, Needham; Steven Richard Winnett, Brookline, both of MA (US)

(73) Assignee: BBNT Solutions LLC, Cambridge, MA (US)

( * ) Notice: Subject to any disclaimer, the term of this patent is extended or adjusted under 35 U.S.C. 154(b) by 0 days.

(21) Appl. No.: 09/643,974

(22) Filed: Aug. 22, 2000

(51) Int. Cl.$^7$ .............................................. H04M 11/00
(52) U.S. Cl. .................. 379/93.15; 379/93.01
(58) Field of Search ........................... 379/93.15, 88.14, 379/88.13, 100.13, 93.01, 92.01, 92.03, 100.06, 100.09

(56) References Cited

U.S. PATENT DOCUMENTS

| | | | | |
|---|---|---|---|---|
| 4,996,707 A | * | 2/1991 | O'Malley et al. ...... | 379/100.13 |
| 5,146,488 A | * | 9/1992 | Okada et al. ............ | 379/93.15 |
| 5,524,137 A | * | 6/1996 | Rhee ........................ | 379/93.15 |
| 5,712,901 A | * | 1/1998 | Meermans ............... | 379/88.14 |
| 5,838,768 A | * | 11/1998 | Sumar et al. ............ | 379/88.14 |
| 5,870,454 A | * | 2/1999 | Dahlen .................... | 379/88.14 |
| 5,872,926 A | * | 2/1999 | Levac et al. ............. | 379/93.15 |
| 5,987,100 A | | 11/1999 | Fortman et al. ......... | 379/88.14 |
| 6,023,700 A | * | 2/2000 | Owens et al. ................. | 707/10 |
| 6,061,718 A | * | 5/2000 | Nelson .................... | 379/88.13 |

* cited by examiner

Primary Examiner—Stella Woo
(74) Attorney, Agent, or Firm—Leonard Charles Suchyta; James K. Weixel

(57) ABSTRACT

A system provides messaging services by transmitting messages to groups of message recipients. The system receives a message from a subscriber in an input format and identifies the group of message recipients to receive the message (510). The system determines one or more output formats for the message for each of the message recipients in the group (530) and converts the message from the input format to the output format(s) when the output format(s) differ from the input format (540). The system then transmits the message to the group of message recipients in the output format(s) (550).

30 Claims, 6 Drawing Sheets

SYSTEMS AND METHODS FOR TRANSMITTING MESSAGES TO PREDEFINED GROUPS

FIELD OF THE INVENTION

The present invention relates generally to telecommunication systems and, more particularly, to a system and method for transmitting a message from a subscriber in one format to a predefined group of message recipients in any format, such as voice, facsimile machine, e-mail, pager, or other formats.

BACKGROUND OF THE INVENTION

Communication between parties is becoming increasingly difficult to manage because groups of people who need to maintain connectivity are becoming more widely dispersed and mobile. Across any group of people, there may be multiple different preferred forms of communication. These forms of communication may interact with personal, portable, or handheld computers, wireless or wireline telephones, facsimile machines, and other personal communications devices.

Contacting a group of people using the various different forms of communication can be a time-consuming process. Also, in certain situations it may be critical that a group of people, such as parents or employees, be contacted immediately. A few examples may clarify this problem.

Suppose, for example, that a social group of fifty (50) individuals meets monthly at different locations and needs a way to contact members in the group for last minute updates and location changes. Contacting everyone by telephone could take hours, and some members may not be available by telephone.

As another example, suppose that a business needs to contact employees in a geographically-dispersed division for an emergency meeting. Suppose further that some employees are available only by mobile phone, others are only accessible via e-mail, and yet others are only accessible via facsimile machine at certain times of the day. Contacting a large group of employees in such a situation could take several hours and/or require an entire team of individuals to perform the contacting.

Another example may further clarify the need for a solution to this communications problem. Suppose that an emergency occurs at an elementary school, requiring the school to be vacated and closed immediately and all parents contacted to pick up their children. In such a situation, the school will typically use television and radio as a way to broadcast their emergency message to all parents. Parents located in the workplace or outside of the home may not hear these announcements. Most parents do, however, have alternative ways to be reached, such as through e-mail, pager, cellular phone, or other mechanisms. It could take hours, however, for all parents to be notified through these various mechanisms.

As a result, there is a need in the art to combine the broadcast features of television and radio with the personal communications methods of today's diverse population. No conventional message system is available today that will permit such an automatic message distribution facility across a wide range of communications mechanisms. If performed on a one-to-one basis, sending the same message, such as "come pick up your child immediately," to multiple parties could be extremely time consuming.

Accordingly, there is a need in the art for a system and a method for sending message information from a subscriber to multiple parties in a previously defined group in a variety of formats. Various members of the group may receive the message in formats compatible with voice phones, pagers, computers, facsimile machines, etc.

SUMMARY OF THE INVENTION

Systems and methods consistent with the present invention address this need by providing a mechanism through which a subscriber can send a message to a previously defined group of individuals, thereby combining the broadcast features of radio and television with the individual communication preferences of a defined group of individuals. The systems and methods may also provide a detailed report on the status of the delivered messages for the subscriber and permit a message recipient to reply back to the subscriber.

In accordance with the purpose of this invention as embodied and broadly described herein, a method, consistent with the present invention, provides messaging services by transmitting messages to groups of message recipients. The method includes receiving a message from a subscriber in an input format; identifying the group of message recipients to receive the message; determining one or more output formats for the message for each of the message recipients in the group; converting the message from the input format to the output format(s) when the output format(s) differ from the input format; and transmitting the message to the group of message recipients in the output format(s).

In another implementation consistent with the present invention, a system sends a message from a subscriber to a group of message recipients. The system includes a group database, a group access unit, a translator, and a message transmission unit. The group database stores identifiers for groups of message recipients and indicators that identify one or more output formats corresponding to each of the message recipients. The group access unit receives a message from a subscriber in an input format, identifies one of the groups of message recipients in the group database to receive the message, and determines the one or more output formats for each of the message recipients in the identified group based on the indicators in the group database. The translator converts the message from the input format to the one or more output formats. The message transmission unit transmits the message to the identified group in the one or more output formats.

In yet another implementation consistent with the present invention, a method monitors the delivery of messages to groups of message recipients. The method includes identifying one of the groups of message recipients to receive a message; determining the message recipients in the identified group of message recipients; transmitting the message to each of the determined message recipients; monitoring a status of the transmission to each of the determined message recipients; and generating a status report based on the monitored status.

In a further implementation consistent with the present invention, a method provides messaging services. The method includes receiving messages from subscribers in multiple subscriber formats; identifying message recipients to receive each of the messages; determining recipient formats corresponding to the identified message recipients; converting each of the messages from the subscriber formats to each of the recipient formats; sending each of the messages to the identified message recipients in the recipient formats; and receiving at least one reply from at least one of the identified message recipients.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings identify the same or similar elements. Also, the following detailed description does not limit the invention. Other embodiments are possible and changes may be made to the embodiments without departing from the spirit and scope of the invention. Instead, the scope of the invention is defined by the appended claims and equivalents.

In the detailed description that follows, "subscriber" refers to a person that subscribes to the services provided by a message broadcast unit. An "ID" or identification number is a unique identifier associated with a specific subscriber. A "message recipient" refers to a person who may or may not subscribe to the message broadcast unit services, but is listed in a previously defined group of individuals that is the target of a message.

The recipients of the message can receive their message in a format different from the format originally used by the subscriber. In addition, the recipients may be permitted to respond to the message via a reply sent back to the original subscriber. Also, a detailed report that provides status on the success of the original message transmission to each recipient in the previously defined group may be provided to the subscriber.

As will be described in detail through the use of the figures to follow, a message broadcast unit, consistent with the present invention, provides a subscriber with the ability to effectively and immediately broadcast a single message to a group of individuals, or message recipients. The message may be provided by the subscriber using a variety of different subscriber equipment. The equipment used by the message recipients may be the same or different from the subscriber equipment.

Exemplary Network Configuration

Figure 1:
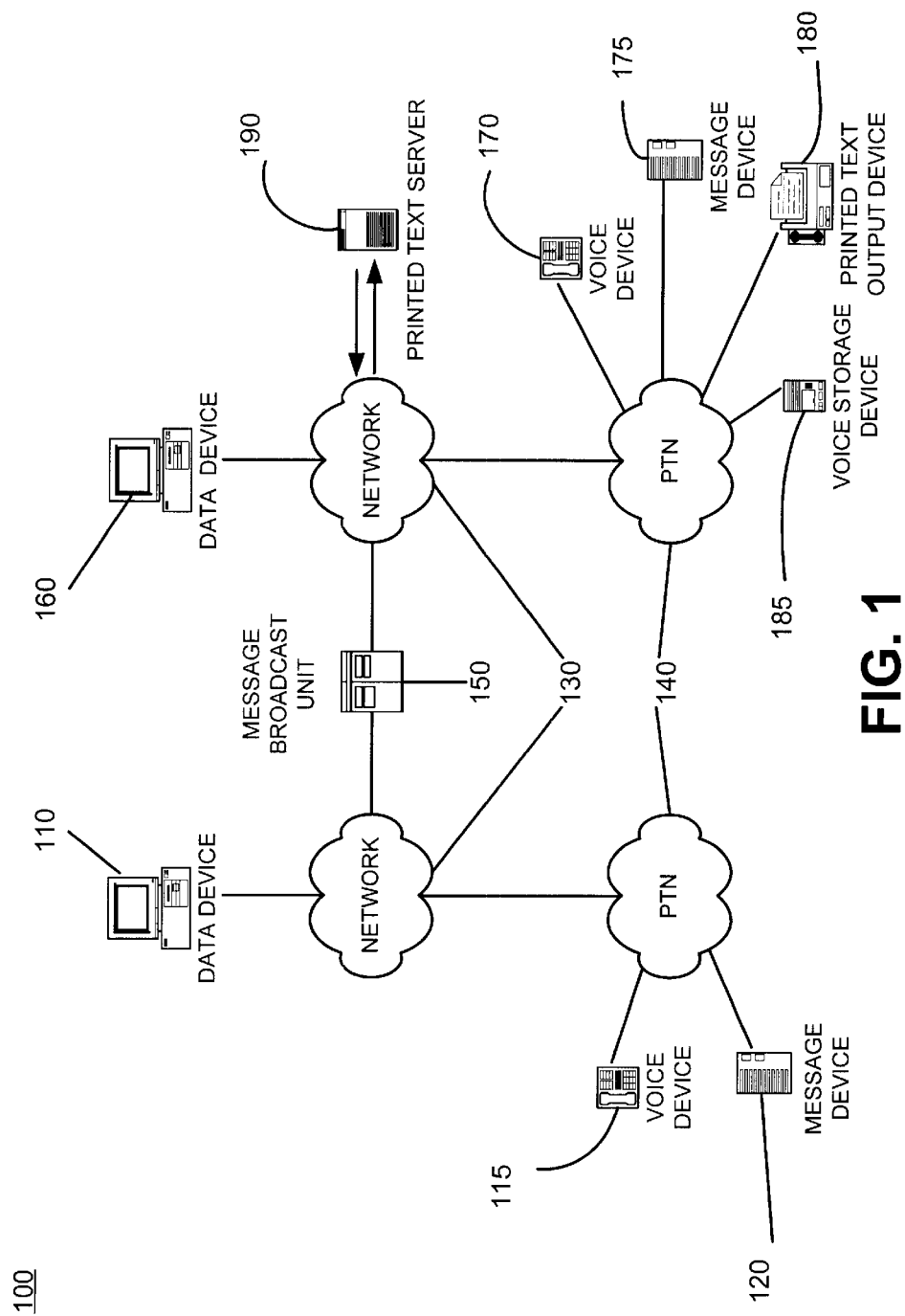
FIG. 1 illustrates an exemplary network in which systems and methods consistent with the present invention may be implemented.

FIG. 1 illustrates an exemplary network 100 in which systems and methods, consistent with the present invention, may be implemented. Network 100 includes subscriber equipment 10–120 that communicate with message recipient equipment 160–190 through one or more networks 130, one or more public telephone networks (PTNs) 140, and message broadcast unit 150. It will be appreciated that the network 1(HX) may include additional transmission devices not shown, such as gateways and routers that aid in the receiving, transmitting, or processing of data. Network 100 may also contain various voice, text, and data processing devices.

The subscriber equipment may include data device 110, voice device 115, and message. device 120. Data device 110 may include any computer-like data communication device, such as a personal computer, a laptop computer, a handheld computer, or any other fixed or mobile device that can input, process, output, and/or display data and connect with network 130. Voice device 115 may include any device that can receive, process, and output voice data, such as a plain old telephone system (POTS) telephone, an analog display services interface (ADSI) telephone, an integrated services digital network (ISDN) telephone, a personal communications services (PCS) wireless telephone, a PCS mobile telephone, or other analog/digital wireless or wireline communication devices. Message device 120 may include any device that can transmit and/or receive text messages through a wireless medium, such as a two-way pager or a personal digital assistant (PDA) that can both transmit and receive data through a public telecommunications network, such as PTN 140.

The subscriber equipment may communicate messages to the message recipient equipment through network 130 and/or PTN 140. Network 130 may include any network that connects various data processing and communication devices together, such as the Internet, a wide area network (WAN), a local area network (LAN), an intranet, or a similar network. PTN 140 may include any public telecommunications network, such as the public switched telephone network (PSTN), that receives, processes, and transmits voice or data through various transmission media.

The message recipient equipment may include data device 160, voice device 170, message device 175, printed text output device 180, voice storage device 185, and printed text server 190. Data device 160 may include any computer-like data communication device, such as a personal computer, a laptop computer, a handheld computer, or any other fixed or mobile device that can input, process, output, and/or display data and connect with network 130. Voice device 170 may include any device that can receive, process, and output voice data, such as a POTS telephone, an ADSI telephone, an ISDN telephone, a PCS wireless telephone, a PCS mobile telephone, and/or other analog/digital wireless or wireline communications devices.

Message device 175 may include any device that can transmit and/or receive text messages through a wireless medium, such as a two-way pager or PDA that can both transmit and receive data through a public telecommunications network, such as PTN 140. Printed text output device 180 may include any device, such as a facsimile machine, that outputs messages or text on paper or a similar material. Voice storage device 185 may include any device, such as an answering machine, that records and stores voice messages for future retrieval by a message recipient. Printed text server 190 may include a conventional server that receives a text message from the network 130 and possibly forwards the message through network 130 and/or PTN 140) to printed text output device 180.

Message broadcast unit 150 may provide messaging services for the network 100. It will be appreciated that message broadcast unit 150 may be implemented via hardware, software, or a combination of hardware and software, and may be composed of separate units or integrated into a single device (as illustrated in FIG. 1). For example, message broadcast unit 150 may include physical components of a computer configured to provide messaging services. Alternatively, message broadcast unit 150 may include software elements of a computer-readable medium configured to provide the messaging services. A computer readable medium may include one or more memory devices and/or carrier waves.

A single message broadcast unit 150, set of subscriber equipment, and set of message recipient equipment have been shown in FIG. 1 for simplicity. It will be appreciated that a typical network 100 might include multiple message broadcast units 150, additional subscriber equipment, and additional message recipient equipment.

Exemplary Message Broadcast Unit

Figure 2:
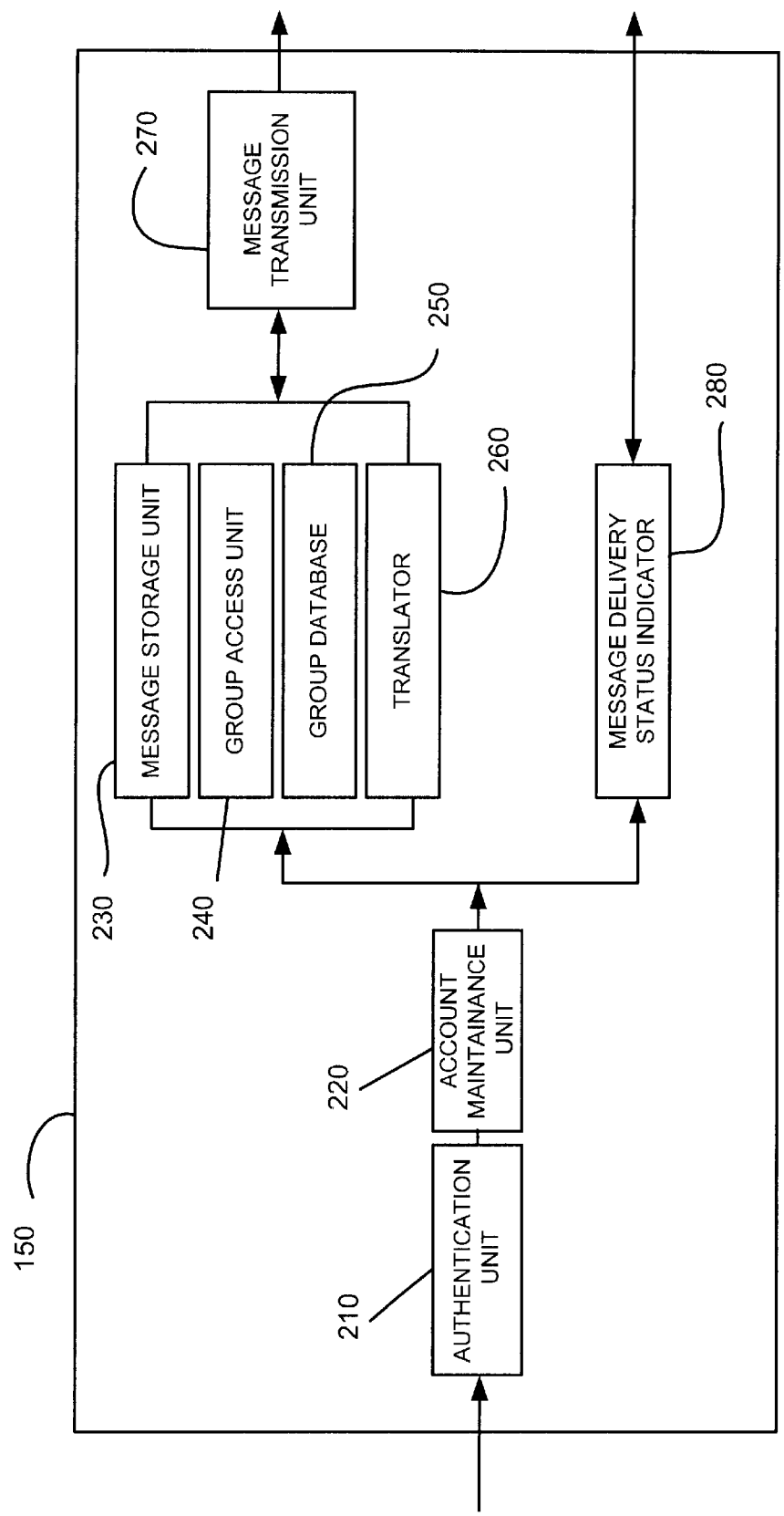
FIG. 2 illustrates an exemplary configuration of the elements of the message broadcast unit of FIG. 1.

FIG. 2 is a detailed diagram of message broadcast unit 150 according to an implementation consistent with the present invention. In FIG. 2, the exemplary message broadcast unit 15 includes authentication unit 210, account maintenance unit 220, message storage unit 230, group access unit 240, group database 250, translator 260, message transmission unit 270, and message delivery status indicator 280.

Authentication unit 210 may contain security features that ensure that only authorized individuals have access to the services provided by the message broadcast unit 150. The authentication unit 210 may include an identification (ID) database (not shown) along with an associated password database (not shown). The ID database may store one or more identifiers (i.e., subscriber IDs) for each subscriber. The password database may store one or more passwords for each of the identifiers in the ID database. These databases may be implemented as a single database. If a subscriber provides the wrong subscriber ID or password, authentication unit 210 may deny the subscriber access to the services provided by message broadcast unit 150.

Account maintenance unit 220 may control two interrelated functions: accounting for services rendered; and prohibiting access to the services of message broadcast unit 150 it the account is not in proper order (e.g., payments have not been rendered, etc.). Accounting for the services rendered may include counting the number of messages sent within a billing period, and other such accounting methods necessary to charge a subscriber for use of the message broadcast unit 150 service. If a subscriber's account is not up-to-date, account maintenance unit 220 may deny the subscriber access to the message broadcast unit 150 service and/or direct the subscriber to a human operator.

Message storage unit 230 may store subscriber messages for later transmission. The messages may be stored in voice and/or data format, depending upon the type of subscriber equipment used to send the messages to the message broadcast unit 150.

Group access unit 240 may identify which specific group (s) of message recipients are associated with each subscriber ID. A group of message recipients is a predefined group of individuals identified by the subscriber. Generally, the individuals of the group share some link or association with each other, such as employees of the same company, parents whose children attend the same school or club, or members of an organization. A subscriber ID can have one or more groups associated with it (i.e., with which it is authorized to transmit messages).

Group access unit 240 may associate each separate group of predetermined message recipients with a unique identifier. The subscriber may use the unique identifier to identify the group of message recipients for which the message is intended. Group access unit 240 may record the group identifier provided by the subscriber for use in a subsequent transmission of the message. In addition, group access unit 240 may prohibit any subscriber from sending a message to a group that is not associated with the subscriber's subscriber ID.

Group database 250 may include a database of names and associated contact information. The database 250 may store the name of each message recipient member of each uniquely identified group, along with the member's phone number, facsimile machine number, e-mail address, and/or pager number to which a message may be sent. In addition, the database 250 may also identify certain days or certain times of the day at which each number or address is valid. Accordingly. each member or message recipient can be associated with a different type of message recipient equipment, as shown in FIG. 1, independent of the subscriber equipment used to record the original message. This database 250 may be established by the subscriber when the account is set up, and may be modified at any time.

Translator 26 may include one or more conventional voice-to-text and/or text-to-voice translation mechanisms that translate voice (messages) to text or text (messages) to voice in a well-known manner for delivery to one or more message recipients. This capability allows various types of subscriber equipment to be used to input the message for transmission to a predefined group of message recipients, each using their own preferred type of message receiving equipment independent of the original subscriber equipment.

Message transmission unit 270 may retrieve the messages stored in message storage unit 230 and query group access unit 240 to identify the unique group to which to send the message and determine contact information for each message recipient within the group and the type of equipment used by the message recipient. Message transmission unit 270 may send each message through translator 260 to ensure the correct message format for each message recipient within the group. Message transmission unit 270 may then transmit the message to the message recipients.

Message delivery status indicator 280 may monitor the status of the message transmission to each recipient. For example, the status may include the following types of information: the delivery attempts that resulted in a busy number, the delivery attempts that resulted in no-answer, the delivery attempts that were answered by a voice storage device 185, and the delivery attempts that were successfully received by the recipients. In addition, message delivery status indicator 280 may also receive and store information provided by the message recipient in the form of a reply to the transmitted message. Message delivery status indicator 280 may combine all of this information into a detailed report that the subscriber can access through the subscriber equipment.

Hard-wired circuitry may be used in place of or in combination with software. instructions to implement the above components. Thus, the present invention is not limited to any specific combination of hardware circuitry and software.

Exemplary Process for Establishing Groups

Figure 3:
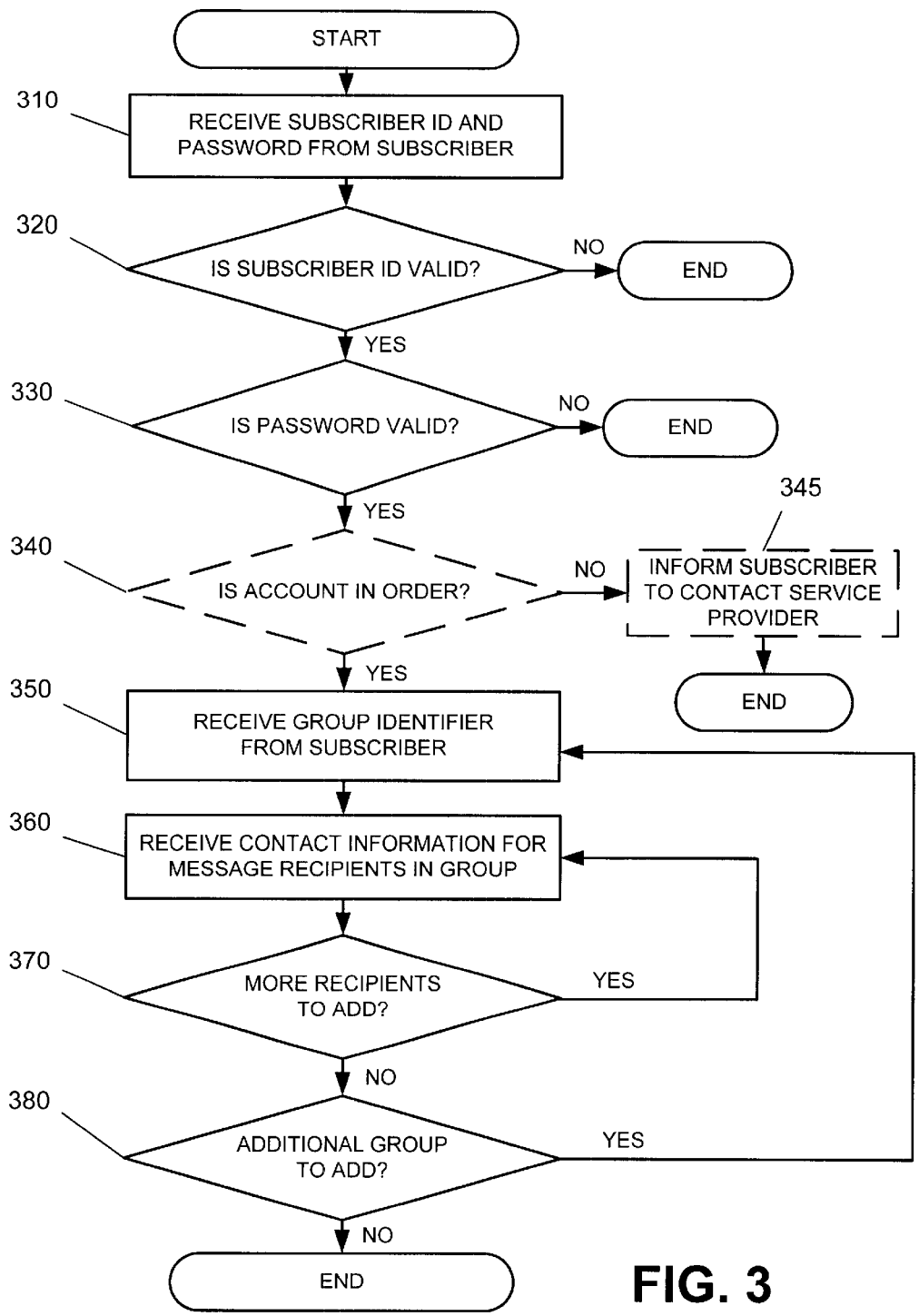
FIG. 3 is a flow chart of a process for establishing a subscriber's group(s) of message recipients.

FIG. 3 illustrates a process for establishing a predefined group of individuals to which the subscriber can transmit messages. This action may be accomplished by the subscriber using the subscriber equipment. For example, the subscriber may access a web site associated with message broadcast unit 150 using a computer or the like, or may dial into message broadcast unit 150 using a telephone or the like. The subscriber may then provide a subscriber ID and password to message broadcast unit 150. The subscriber may access a web page using data device 110 to enter the subscriber ID and password. Alternately, the subscriber may use, for example, the alphanumeric keypad of voice device 115 to enter the subscriber ID and password.

In any event, message broadcast unit 150 receives the subscriber ID and password from the subscriber (step 310). Message broadcast unit 150 may then determine whether the subscriber ID corresponds to a valid subscriber (step 320). Message broadcast unit 150 may make this determination by comparing the subscriber ID provided by the subscriber to the identifiers stored by authentication unit 210. If the subscriber ID is not valid, message broadcast unit 150 may deny the subscriber access to the message broadcast unit 150 service. Message broadcast unit 150 may provide the subscriber with a voice or text message indicating that the subscriber ID is invalid.

If the subscriber ID is valid, however, the message broadcast unit 150 may then authenticate the subscriber by determining whether the password provided by the subscriber corresponds to the pre-stored password associated with the subscriber ID (step 330). Message broadcast unit 150 may make this determination by comparing the password to the corresponding password stored by authentication unit 210 for the subscriber ID. Alternately, message broadcast unit 150 may use other techniques to authenticate the subscriber, such as biometric mechanisms or other identifying devices that can uniquely identify the subscriber. If the password is invalid, the subscriber may be denied access to the service. Message broadcast unit 150 may provide the subscriber with a text or voice message indicating that access is being denied due to entry of a wrong or invalid password and may possibly permit the subscriber to re-enter the password.

If the entered password is valid, message broadcast unit 150 may then perform the optional step of determining whether the account is in order (step 340). This optional step may include a determination as to whether the account is paid up-to-date, or any other criteria associated with the accounting maintenance of a subscriber account. If the account is determined not to be in order, then the subscriber may be informed to contact the service provider to reestablish access to the service (step 345). Message broadcast unit 150 may inform the subscriber through a text or voice message that the subscriber may call the service provider at a specified phone number to talk to a service representative.

If the account is in order, however, the subscriber may be prompted to enter a unique identifier (e.g., an eight digit number) for the group of message recipients now being established (step 350). The subscriber may provide the unique group identifier through a voice or text message, possibly after message broadcast unit 150 provides technical requirements for establishing a valid group identifier, such as that it must be at least eight characters long and contain at least one non-alphanumeric character. Next, the subscriber may be prompted to enter the contact information for each of the message recipients in the group (step 360). The subscriber may respond by providing the name and phone number, facsimile machine number, e-mail address, and/or pager number for the message recipient, along with the type of equipment used by the message recipient.

When a particular message recipient has two or more ways of being contacted, the subscriber may also be prompted to provide an order in which the message recipient is to be contacted. For example, it may be desirable to contact a particular message recipient via telephone before attempting to contact the recipient via facsimile or e-mail.

The subscriber may then be prompted to add more recipients (step 370). Message broadcast unit 150 may prompt the subscriber to respond to the question "Do additional message recipients need to be added to the current group?" If more recipients are to be added, steps 360 and 370 may be repeated as necessary. If no more message recipients are to be added to the group now being established, message broadcast unit 150 may prompt the subscriber to create an additional new group of message recipients or end the session (step 380). Message broadcast unit 150 may prompt the subscriber to respond to the question "Do you wish to create a new group of message recipients?". If more groups are to be added, steps 350 though 38 may be repeated as necessary. Otherwise, message broadcast unit 150 may end the session.

Exemplary Process for Sending Subscriber Message

Figure 4:
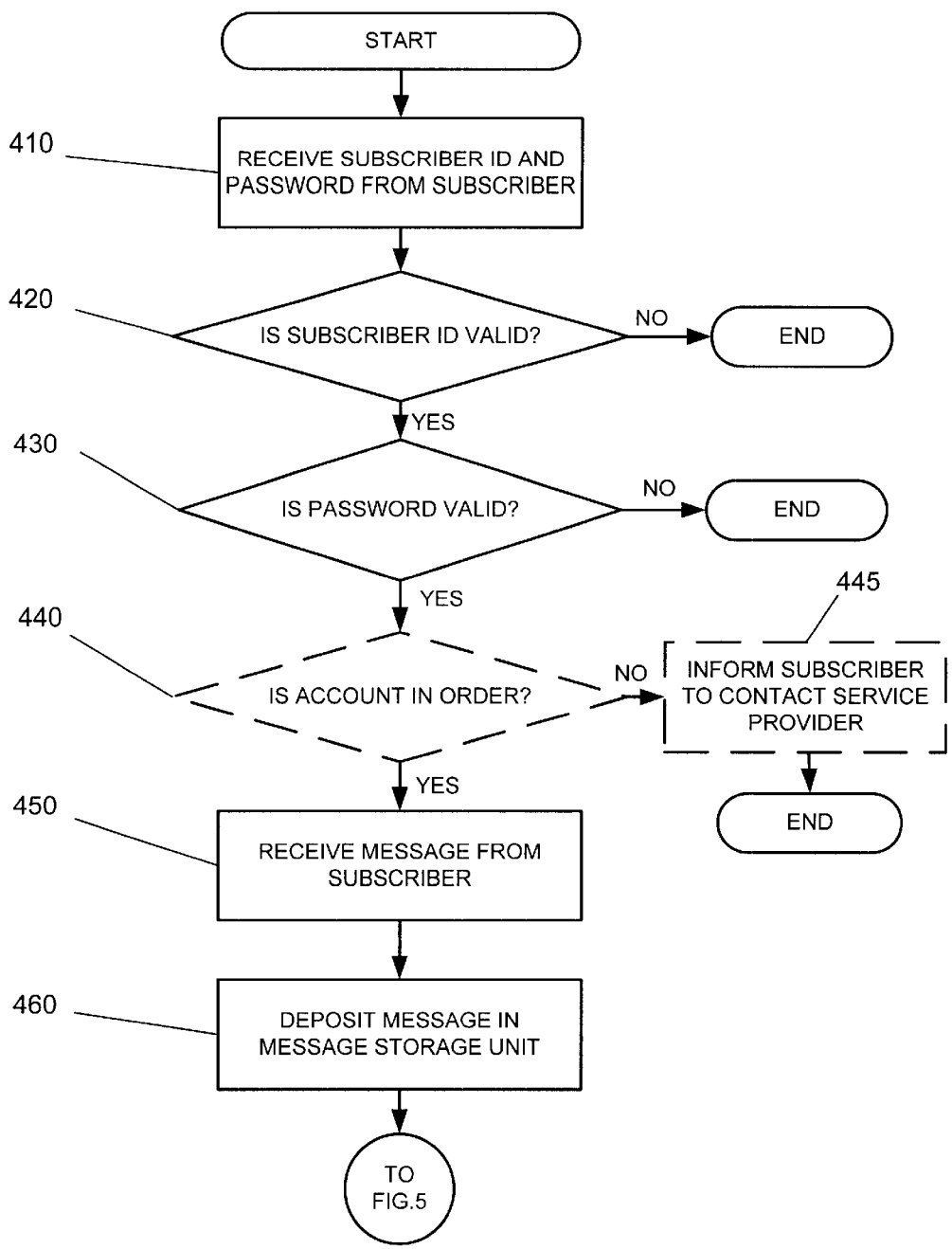
FIG. 4 is a flow chart of a process for storing a subscriber's message.

FIG. 4 illustrates a process for storing a subscriber's message for transmission to a predefined group. Steps 410 through 445 may be performed as described with regard to steps 310 through 345 in FIG. 3 to authenticate the subscriber and, as an option, to ensure an up-to-date account. Next, the subscriber may be prompted to provide the message to be transmitted (step 450). If the subscriber uses a voice device 115, for example, the message may be provided in voice format by simply speaking into a telephone receiver. If the subscriber uses a message device 120, for example, the message may be provided through manipulation of a device keypad. If the subscriber uses a data device 110, for example, the message may be provided through manipulation of a data input device, such as a keyboard, or by speaking into an associated microphone. The message may then be temporarily stored in message storage unit 230 to await transmission (step 460). Message broadcast unit 150 may retain the voice or text message in message storage unit 230 until it determines to which group of message recipients the message is to be sent.

Figure 5:
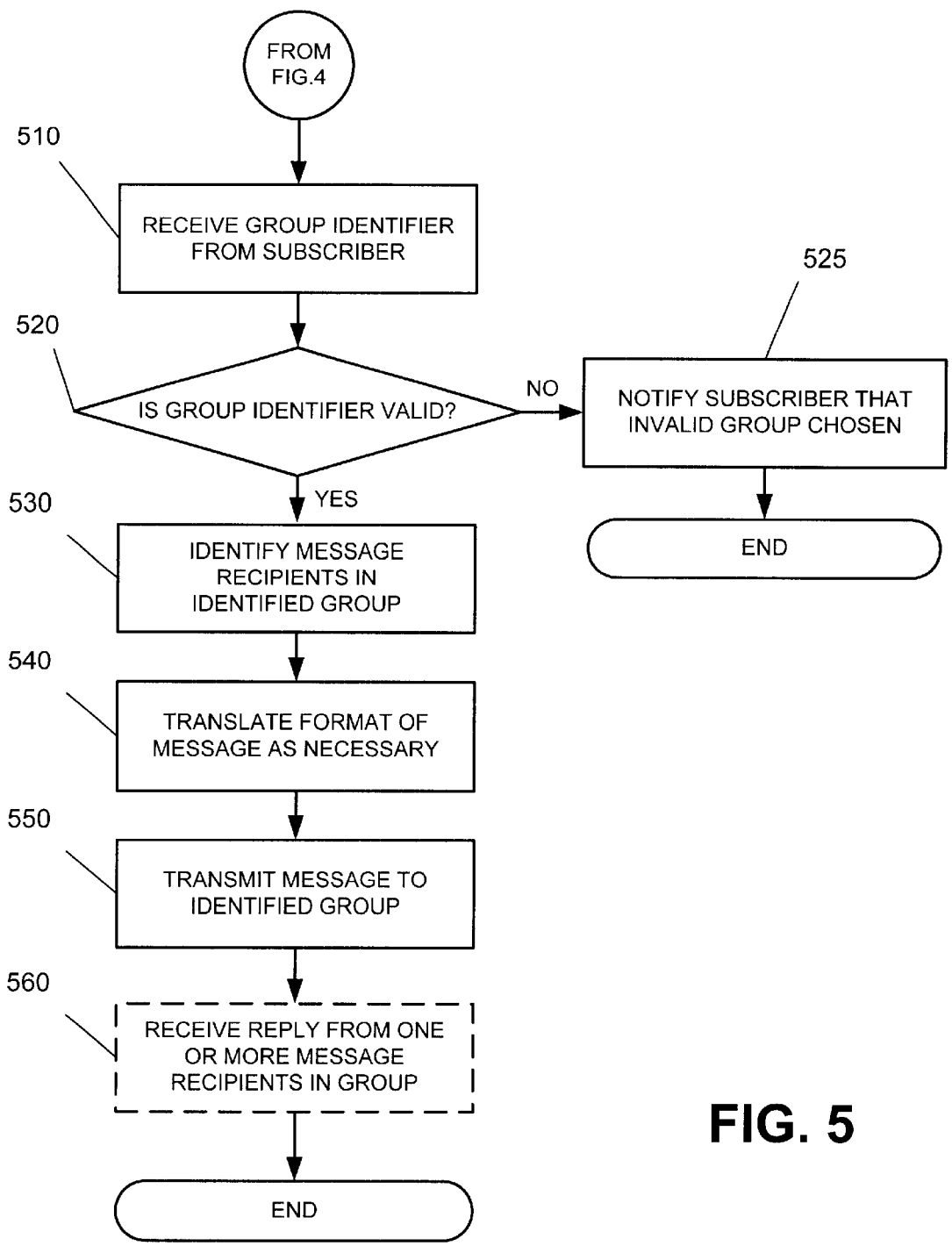
FIG. 5 is a flow chart of a process for transmitting a subscriber's message to a predefined group of individuals.

FIG. 5 illustrates a process for transmitting the stored message to a predefined group. A unique group identifier may be received from the subscriber to indicate to which group the stored message is to be sent (step 510). Message broadcast unit 15 may prompt the subscriber to enter the unique group identifier as text or voice, depending upon the type of subscriber equipment being used by the subscriber.

Group access unit 240 may determine whether the subscriber has defined such a group (step 520). This determination may be made by accessing a database, such as group database 250. Group database 250 may store information that links a subscriber ID with the group identifiers available to that subscriber. The subscriber may have access to only those groups that are linked to the subscriber ID. If the group identified is not available to the subscriber, the subscriber may be notified of this fact and the session ended (step 525). Message broadcast unit 150 may notify the subscriber with a voice or text message that states that the group specified is not one of the unique groups defined by the subscriber.

If the group identified is available to the subscriber, however, group access unit 240 may identify the message recipients in the identified group (step 530). Group access unit 240 may access group database 250 to obtain contact information and the equipment type associated with each message recipient. If the equipment type indicates that the original message needs to be translated to another form because, for example, the equipment type differs from the type of equipment used by the subscriber, translator 260 may convert the format of the message to correspond with the proper format for each type of message recipient equipment, such as data device 160, voice device 170, message device 175, voice storage device 185, or printed text output device 180 (step 540). The translator 260 may perform the translations to the different formats concurrently. Message transmission unit 270 may then transmit the message to all message recipients within the group (step 550).

In some implementations consistent with the present invention, the message recipients may be permitted to reply to the message from the subscriber. In this case, a message recipient may inform message broadcast unit 150 of the reply and transmit the reply to message broadcast unit 150 (step 540). Message broadcast unit 150 may then relay the reply to the subscriber, store the reply for subsequent retrieval by the subscriber, or include the reply in a status report to be sent to the subscriber.

Exemplary Process for Delivering Status Report

Figure 6:
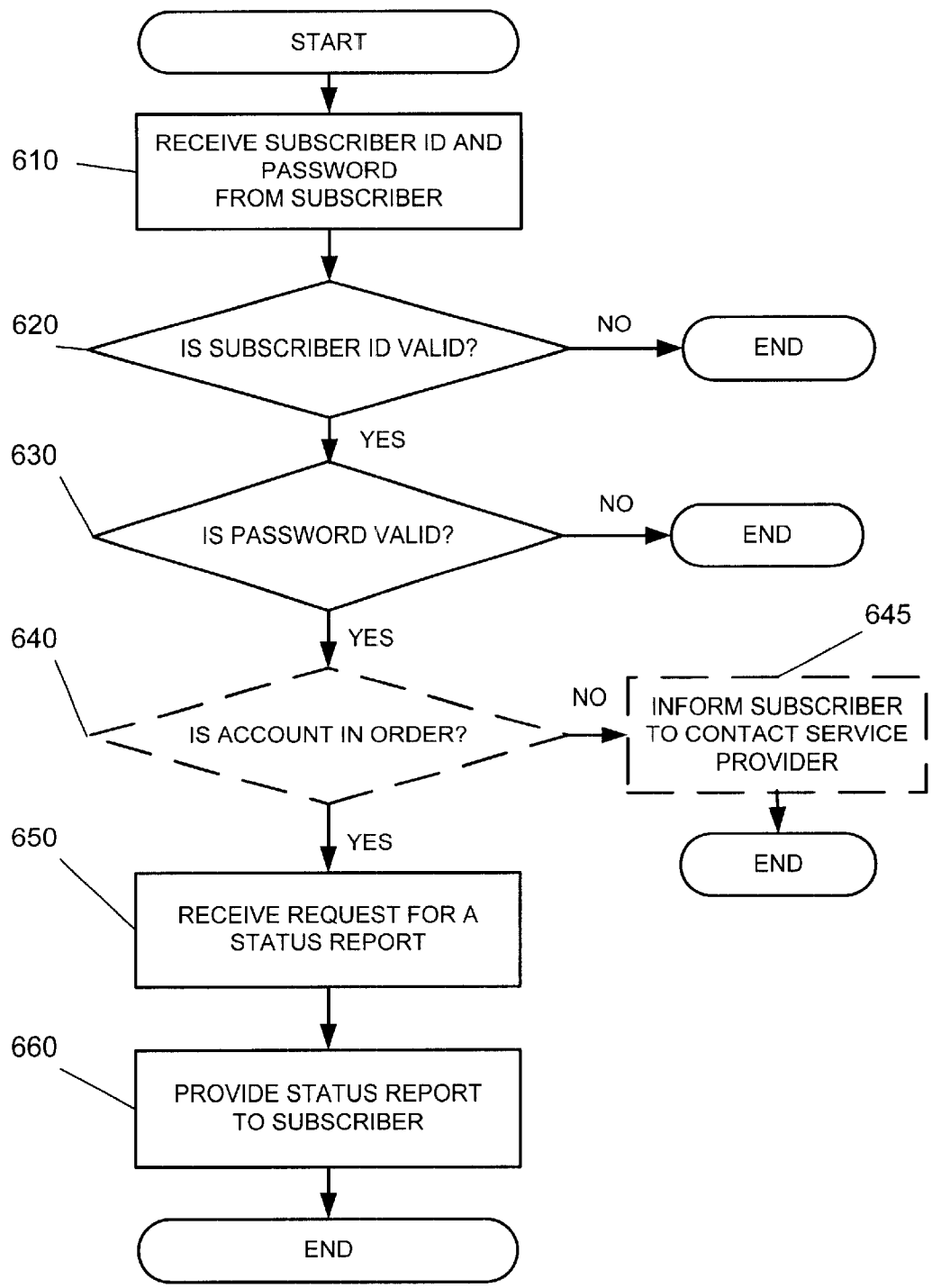
FIG. 6 is a flow chart of a process that permits a subscriber to get a report on the result of the message previously broadcast to the predefined group of individuals.

FIG. 6 illustrates a process for providing a subscriber with a report on the status of all messages sent to message recipients. Steps 610 through 645 may be performed as described with respect to steps 310 through 345 in FIG. 3 to authenticate the subscriber and, optionally, to ensure an up-to-date account. Next, message broadcast unit 150 may receive a request for a report on the status of a previously or currently transmitted message to a group of individuals (step 650). The subscriber may communicate with message broadcast unit 150 through network 130 and/or PTN 140. Message broadcast unit 150 may prompt the subscriber to input the unique group identifier to which a message was or is being sent. The subscriber may also be prompted for additional information, such as the date of the message transmission or a unique identifier associated with the message itself. Message broadcast unit 150 may use this information to retrieve the correct report for the subscriber.

Message delivery status indicator 280 may then provide a report to the subscriber (step 660). The report may include information corresponding to each message recipient, such as the message was received, the lie was busy, there was no answer, the call was received by a voice storage device 185, or an e-mad was delivered to and received by the message recipient. When message broadcast unit 150 attempts delivery to more than one device of a message 40 recipient, the report may contain status information about all of the delivery attempts. Message broadcast unit 150 may transmit the report over network 130 to the subscriber.

In another implementation consistent with the present invention, message broadcast unit 150 automatically provides a status report to the subscriber without requiring the subscriber to request it. Message broadcast unit 150 may transmit the report after successfully transmitting the message to all message recipients or after a predetermined period of time elapses.

CONCLUSION

Systems and methods consistent with the present invention provide a mechanism by which a subscriber to a message broadcast service may transmit a message to an entire group of individuals with a single voice or data transmission. Each message recipient in the group can receive the message via any form of communication, such as a phone call (to any location and any type of phone), a pager transmission, an answering machine message, a facsimile transmission, an e-mail, or any other type of information transmission. In addition, the subscriber may obtain a detailed report on the success or status of the message transmission. In some implementations consistent with the present invention, the message recipient may. also. transmit a reply back to the subscriber.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while particular types of communications devices have been shown in FIG. 1, other types of devices may be used in other implementations consistent with the present invention. The scope of the invention is defined by the claims and their equivalents.

What is claimed is:

1. A method for transmitting messages to groups of message recipients, comprising:
   receiving a message from a subscriber in an input format;
   identifying one of the groups of message recipients to receive the message;
   determining one or more output formats for the message for each of the message recipients in the group of message recipients;
   converting the message from the input format to the one or more output formats when the one or more output formats differ from the input format;
   transmitting the message to the group of message recipients in the one or more output formats; and
   monitoring a status of the transmission of the message to each of the message recipients in the group of message recipients, the status indicating whether the transmission was successful, resulted in a busy signal, resulted in a no-answer, or was answered by a voice storage device.

2. The method of claim 1, further including:
   authenticating the subscriber before identifying the group of message recipients.

3. The method of claim 1, wherein the transmitting includes:
   transmitting the message to one of the message recipients in a first one to the output formats,
   determining whether the transmitting was successful, and
   sending the message to the one message recipient in a second one of the output formats when the transmitting in the first output format was unsuccessful.

4. The method of claim 1, further including:
   identifying the message recipients in the group of message recipients.

5. The method of claim 4, wherein the identifying the message recipients includes:
   obtaining contact information for each of the message recipients.

6. The method of claim 5, wherein the obtaining includes:
   receiving at least one of a number and address for locating each of the message recipients, and
   receiving an identification of a type of equipment used by each of the message recipients.

7. The method of claim 1, wherein the determining includes:
   identifying one or more types of equipment used by each of the message recipients, and identifying one or more of the output formats corresponding to each of the identified types of equipment.

8. The method of claim 7, wherein the determining further includes:
identifying periods of time when the identified types of equipment are valid.

9. The method of claim 1, wherein the one or more output formats include a plurality of different output formats: and
wherein the converting includes:
translating the message from the input format to the different output formats concurrently.

10. The method of claim 1, further comprising:
receiving one or more replies to the message from the message recipients, and
providing the replies to the subscriber.

11. The method of claim 1, further comprising:
generating a status report from the monitored status.

12. The method of claim 1, wherein the input format is one of a plurality of input formats: and
wherein the converting includes:
determining whether the one or more output formats match the input format.

13. The method of claim 1, wherein the identifying includes:
receiving a group identifier from the subscriber,
determining the group that corresponds to the group identifier,
verifying that the subscriber is authorized to access the group corresponding to the group identifier, and
locating, in a database, the message recipients in the group when the subscriber is authorized to access the group.

14. A system for transmitting messages from subscribers to groups of message recipients, comprising:
means for obtaining messages from the subscribers in one or more input formats;
means for identifying one of the groups of message recipients to receive each of the messages;
means for determining a plurality of output formats for each of the messages and corresponding to the message recipients in each of the groups of message recipients;
means for translating the messages from the one or more input formats to the output formats when the output formats differ from the one or more input formats;
means for transmitting the messages to the identified groups of message recipients in the output formats; and
means for monitoring a status of the transmission of the message to each of the message recipients in each of the identified groups, the status indicating whether the transmission was successful, resulted in a busy signal, resulted in a no-answer, or was answered by a voice storage device.

15. A system for sending messages from subscribers to groups of message recipients, comprising:
a group database configured to store identifiers for a plurality of groups of message recipients and indicators that identify one or more output formats corresponding to each of the message recipients;
a group access unit configured to receive a message from a subscriber in an input format, identify one of the groups of message recipients in the group database to receive the message, and determine the one or more output formats for each of the message recipients in the identified group based on the indicators in the group database;
a translator configured to convert the message from the input format to the one or more output formats;
a message transmission unit configured to transmit the message to the identified group in the one or more output formats; and
a message status unit configured to monitor a status of the transmission of the message to each of the message recipients in the identified group, the status indicating whether the transmission was successful, resulted in a busy signal, resulted in a no-answer, or was answered by a voice storage device.

16. The system of claim 15, further including:
an authentication unit configured to authenticate the subscriber.

17. The system of claim 15, wherein the message transmission unit is configured to transmit the message to one of the message recipients in the identified group in a first one of the output formats, determine whether the transmission was successful, and send the message to the one message recipient in a second one of the output formats when the transmission in the first output format was unsuccessful.

18. The system of claim 15, wherein the group access unit is further configured to predefine the groups of message recipients in the group database.

19. The system of claim 18, wherein the group access unit is further configured to obtain contact information for each of the message recipients.

20. The system of claim 19, wherein the group access unit is further configured to receive information for each of the message recipients including at least one of a number and address for locating the message recipient and an identification of a type of equipment used by the message recipient, and store the received information in the group database.

21. The system of claim 15, wherein the group access unit is configured to identify one or more types of equipment used by each of the message recipients, and identify one or more of the output formats corresponding to each of the identified types of equipment.

22. The system of claim 21, wherein the group access unit is further configured to identify periods of time when the identified types of equipment are valid.

23. The system of claim 15, wherein the one or more output formats include a plurality of different output formats; and
wherein the translator is configured to concurrently translate the message from the input format to the different output formats.

24. The system of claim 15, further comprising:
a message delivery indicator configured to receive one or more replies to the message from the message recipients, and provide the replies to the subscriber.

25. The system of claim 15, wherein the message status unit is further configured to generate a status report from the monitored status.

26. The system of claim 15, wherein the input format is one of a plurality of input formats; and
wherein the translator is further configured to determine whether the one or more output formats match the one input format.

27. The system of claim 15, wherein the group access unit is configured to receive one of the identifiers from the subscriber locate the group that corresponds to the received identifier in the group database, verify that the subscriber is authorized to access the group corresponding to the received identifier, and identify the message recipients in the group from the group database when the subscriber is authorized to access the group.

28. A computer-readable medium that stores instructions executable by at least one processor to perform a method for transmitting messages from subscribers to a plurality of groups of message recipients, comprising:

instructions for identifying one of the groups of message recipients to receive a message from a subscriber;

instructions for determining one or more output formats for the message for each of the message recipients in the identified group of message recipients;

instructions for translating the message to the one or more output formats;

instructions for transmitting the message to the identified group of message recipients in the one or more output formats; and instructions for monitoring a status of the transmission of the message to each of the message recipients in the identified group of message recipients, the status indicating whether the transmission was successful, resulted in a busy signal, resulted in a no-answer, or was answered by a voice storage device.

29. A method for monitoring delivery of messages to groups of message recipients, comprising:

identifying one of the groups of message recipients to receive a message;

determining the message recipients in the identified group of message recipients;

transmitting the message to each of the determined message recipients;

monitoring a status of the transmission to each of the determined message recipients, the status indicating whether the transmission was successful, resulted in a busy signal, resulted in a no-answer, or was answered by a voice storage device; and generating a status report based on the monitored status.

30. The method of claim 29, further comprising:

receiving one or more replies to the message from the determined message recipients, and incorporating the one or more replies in the status report.

\* \* \* \* \*